US010572501B2

(12) United States Patent
Appel et al.

(10) Patent No.: US 10,572,501 B2
(45) Date of Patent: Feb. 25, 2020

(54) STEERING GRAPH MINING ALGORITHMS APPLIED TO COMPLEX NETWORKS

(71) Applicant: INTERNATIONAL BUSINESS MACHINES CORPORATION, Armonk, NY (US)

(72) Inventors: Ana Paula Appel, Sao Paulo (BR); Heloisa Caroline De Souza Pereira Candello, Hortolandia (BR); Vagner Figueredo De Santana, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 958 days.

(21) Appl. No.: 14/979,819

(22) Filed: Dec. 28, 2015

(65) Prior Publication Data

US 2017/0185910 A1    Jun. 29, 2017

(51) Int. Cl.
*G06F 16/26* (2019.01)
*G06F 16/2457* (2019.01)

(52) U.S. Cl.
CPC ........ *G06F 16/26* (2019.01); *G06F 16/24578* (2019.01)

(58) Field of Classification Search
CPC .................................................... G06F 16/26
USPC ................................................. 707/748, 736
See application file for complete search history.

(56) References Cited

U.S. PATENT DOCUMENTS

| 6,154,213 | A | 11/2000 | Rennison et al. |
|---|---|---|---|
| 7,730,085 | B2 | 6/2010 | Hassan et al. |
| 7,890,510 | B2 | 2/2011 | Aggarwal et al. |
| 8,126,926 | B2 | 2/2012 | Atre et al. |
| 8,346,766 | B2 | 1/2013 | Jamjoom et al. |
| 8,645,339 | B2 | 2/2014 | Kang et al. |
| 9,128,995 | B1 | 9/2015 | Fletcher et al. |
| 10,089,368 | B2 | 10/2018 | Pominville et al. |
| 10,360,196 | B2 | 7/2019 | Hsiao et al. |
| 2003/0154443 | A1 | 8/2003 | Papierniak et al. |
| 2006/0271564 | A1 | 11/2006 | Meng Muntz et al. |
| 2008/0104225 | A1 | 5/2008 | Zhang et al. |
| 2008/0243521 | A9 | 10/2008 | Coale et al. |
| 2010/0076913 | A1* | 3/2010 | Yang ..................... G06N 7/005 706/13 |

(Continued)

FOREIGN PATENT DOCUMENTS

CN    103309972    9/2013
CN    103761271    4/2014
(Continued)

*Primary Examiner* — Syling Yen
(74) *Attorney, Agent, or Firm* — F. Chau & Associates, LLC

(57) ABSTRACT

A user guided data mining system includes: a database storing a network graph comprising a plurality nodes and edges, node attributes for the nodes, and edge attributes for the edges; and a data mining module configured to: request feedback from a user indicating at least one of the node attributes, visualize the network graph considering the indicated attributes, request feedback from the user indicating a part of the visualized network graph and a class of graph mining algorithm, and rank a plurality of different graph mining algorithms of the indicated class based on the indicated part.

20 Claims, 5 Drawing Sheets

(56) References Cited

U.S. PATENT DOCUMENTS

| | | |
|---|---|---|
| 2010/0185935 A1 | 7/2010 | Yang et al. |
| 2011/0113385 A1 | 5/2011 | Sayers et al. |
| 2011/0145262 A1* | 6/2011 | Jamjoom .......... G06F 17/30958 707/748 |
| 2011/0283205 A1* | 11/2011 | Nie .................. G06F 17/30867 715/763 |
| 2013/0013549 A1* | 1/2013 | Chang ................... G06Q 10/00 706/48 |
| 2014/0067808 A1 | 3/2014 | Narang et al. |
| 2014/0129936 A1* | 5/2014 | Richards ............. G06F 21/6218 715/716 |
| 2015/0293954 A1 | 10/2015 | Hsiao et al. |
| 2017/0083589 A1 | 3/2017 | Pominville et al. |
| 2018/0137155 A1* | 5/2018 | Majumdar ........ G06F 17/30587 |

FOREIGN PATENT DOCUMENTS

| | | |
|---|---|---|
| CN | 103838820 | 6/2014 |
| CN | 103853835 | 6/2014 |
| CN | 103886169 | 6/2014 |
| WO | 2007/100834 | 9/2007 |
| WO | 2014/031451 | 2/2014 |

* cited by examiner

STEERING GRAPH MINING ALGORITHMS APPLIED TO COMPLEX NETWORKS

BACKGROUND

The present invention relates to the field of data mining of large complex networks of information nodes.

Mining large complex networks of information nodes is a difficult task due to the sheer volume of data. A visual interaction with the network can be used to aid in the mining process. However, visual mining of large networks is a complicated and expensive process. In the study of complex networks, a network is said to have a community structure if the nodes of the network can be easily grouped into sets of nodes such that each set of nodes is densely connected internally. Community detection algorithms can be applied to these networks to find the community structure. However, the results of these algorithms may be difficult for an end-user to understand, especially when the dataset considered involves more than a few dozens of nodes. Also, community detection algorithms are costly mathematical processes where users are not allowed to interfere. If the user wants to change any parameter or change the algorithm, the user needs to re-run the entire algorithm all over again.

SUMMARY

According to an exemplary embodiment of the invention, a user guided data mining system includes: a database storing a network graph comprising a plurality nodes and edges, node attributes for the nodes, and edge attributes for the edges; and a data mining module configured to: request feedback from a user indicating at least one of the node attributes, visualize the network graph considering the indicated attributes, request feedback from the user indicating a part of the visualized network graph and a class of graph mining algorithm, and rank a plurality of different graph mining algorithms of the indicated class based on the indicated part.

According to an exemplary embodiment of the invention, a method of operating a user guided data miner on a network graph includes: requesting feedback from a user indicating at least one of a plurality attributes of the network graph; visualizing the network graph considering the indicated attributes; requesting feedback from the user indicating a part of the visualized network graph and a class of graph mining algorithm; and ranking a plurality of different graph mining algorithms of the indicated class based on the indicated part.

According to an exemplary embodiment of the invention, a computer program product for providing user guided data mining of a network graph is provided. The computer program product includes a computer readable storage medium having program code embodied therewith, where the program code is executable by a processor, to perform method steps comprising instructions for: requesting feedback from a user indicating at least one of a plurality attributes of the network graph; visualizing the network graph considering the indicated attributes; requesting feedback from the user indicating a part of the visualized network graph and a class of graph mining algorithm; and ranking a plurality of different graph mining algorithms of the indicated class based on the indicated part.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

Figure 1:
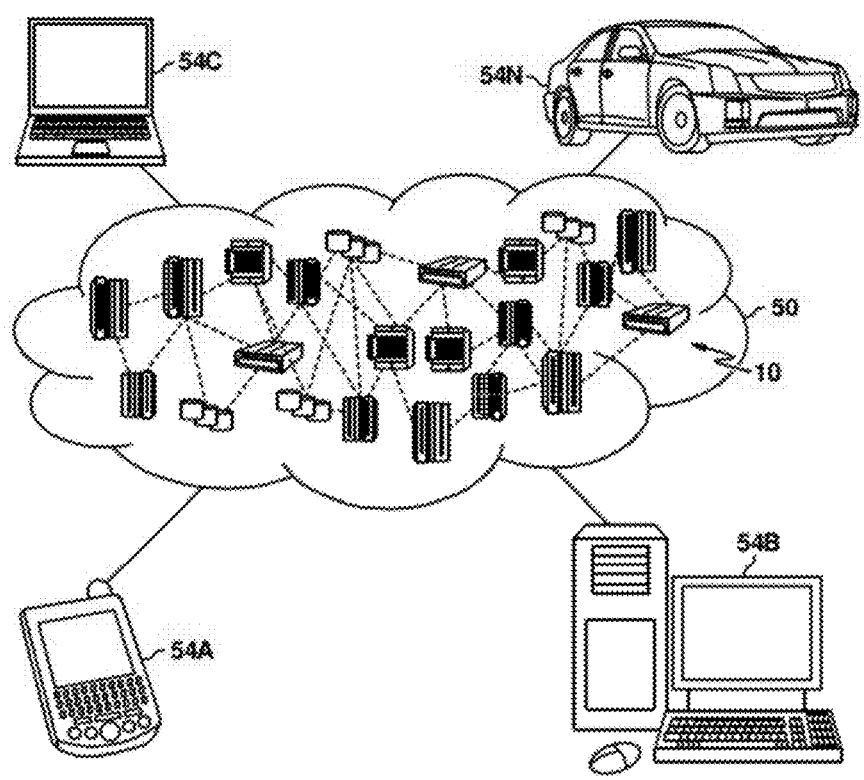
FIG. 1 illustrates a cloud computing environment according to an embodiment of the present invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
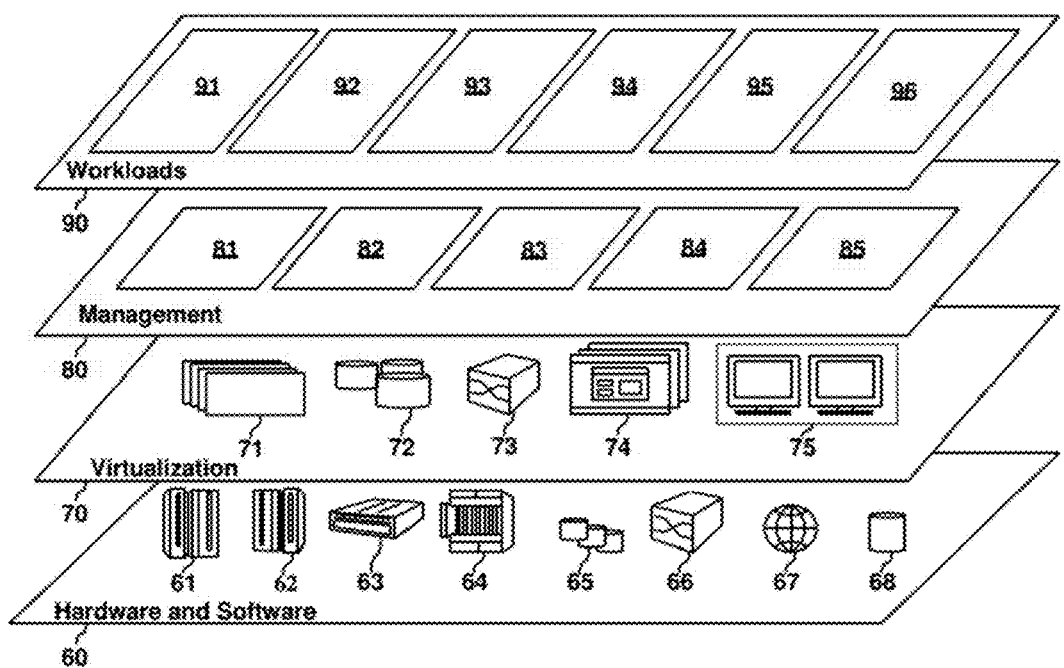
FIG. 2 depicts abstraction model layers according to an embodiment of the present invention, which may be used to implement a user guided data miner.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a user guided data miner 96. The user guided data miner 96 will be discussed in more detail below.

Figure 3:
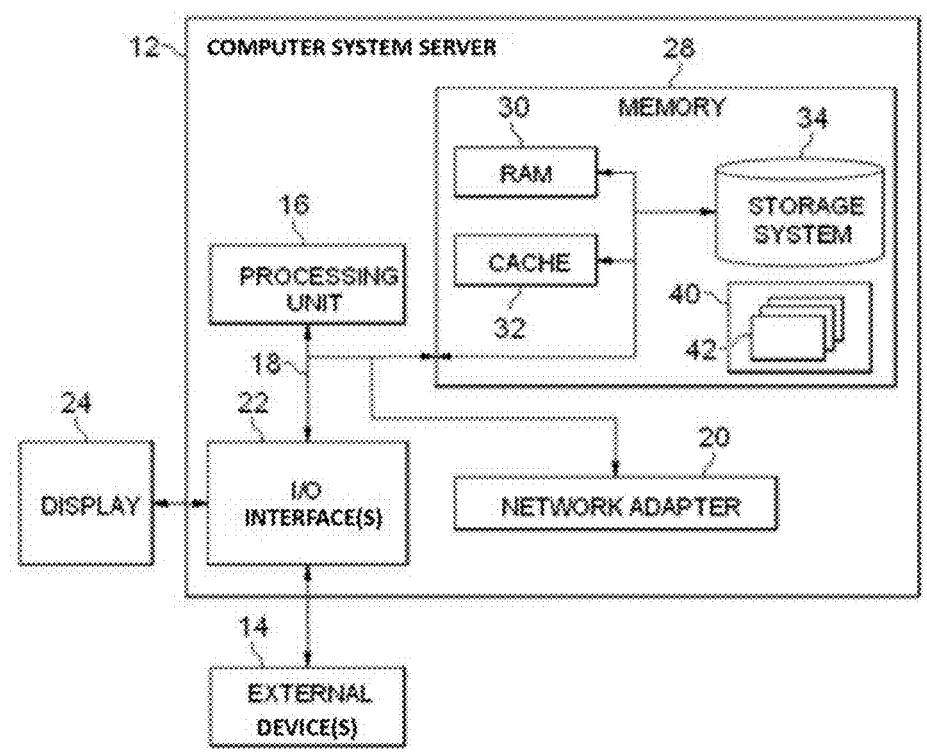
FIG. 3 shows an exemplary computer system, in which the user guided data miner may reside.

FIG. 3 illustrates an embodiment of a computer server that may be used to implement part of computing devices 54A-54N or the user guided data miner 96, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
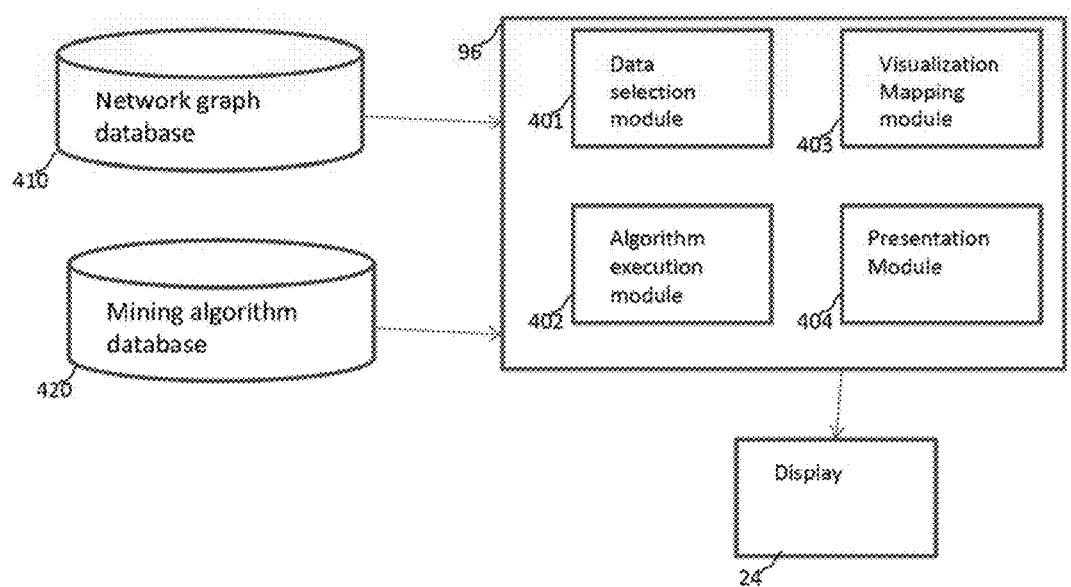
FIG. 4 shows an architecture of the user guided data miner according to an exemplary embodiment of the present invention.

FIG. 4 illustrates the user guided data miner 96 according to an exemplary embodiment of the invention. The user guided data miner 96 allows users to upload and interact with a complex network of data using several types of graph mining algorithms to accomplish visual mining of the network. The data miner 96 suggests the best graphical layout to visualize the network, but the user can change it. The user will guide the mining processes performed by the guided data miner 96 by selecting a piece of the network (e.g., a subgraph) that the user believes could give the best answer to their query of the network. The user defines the task (i.e., the query) and thus the class of mining algorithm that will be applied to the network. The user guided data miner 96 will suggest the best algorithm for the chosen subgraph. The user can apply different algorithms for different parts of the network and the user guided data miner 96 can inform the user of the amount of time it will take to mine that part. If the time is too much, the user can select a smaller portion of the network or a different part of the network to be mined. The data mining module can rank the different graph mining algorithms based on an amount of time it takes to execute each graph mining algorithm on the part of the network graph, accuracy of the graph mining algorithms, accuracy of the graph mining algorithms, user preferences, or novelty of the graph mining algorithms.

The user guided data miner 96 includes a data selection module 401, an algorithm selection module 402, a mapping module 403, and a presentation module 404. The data miner 96 interacts with a network graph database 410 and a mining algorithm database 420. The network graph database 410 stores one or more complex network graphs, where each graph includes a plurality of nodes. Each node is connected to another one of the other nodes through a node connection referred to as an edge. Thus, a pair of the nodes is related to one another by the edge that connects them. The network graph database 410 stores information on the nodes (e.g., node attributes) and information on the edges (e.g., edge attributes).

Examples of the node attributes include a particular weight, name, job, skill, age, etc. Examples of the edge attributes includes a strength, a time, a weight, a name, a category, a relationship, a degree, fairness, closeness, betweenness, etc. For example, degree may be defined as the number of edges (also referred to as links) incident upon a node (i.e., the number of ties that a node has). In connected graphs there is a natural distance metric between all pairs of nodes, defined by the length of their shortest paths. The fairness of a node may be defined as the sum of its distances from all other nodes, and its closeness may be defined as the reciprocal of the fairness. Betweenness quantifies the number of times a node acts as a bridge along the shortest path between two other nodes.

Figure 5:
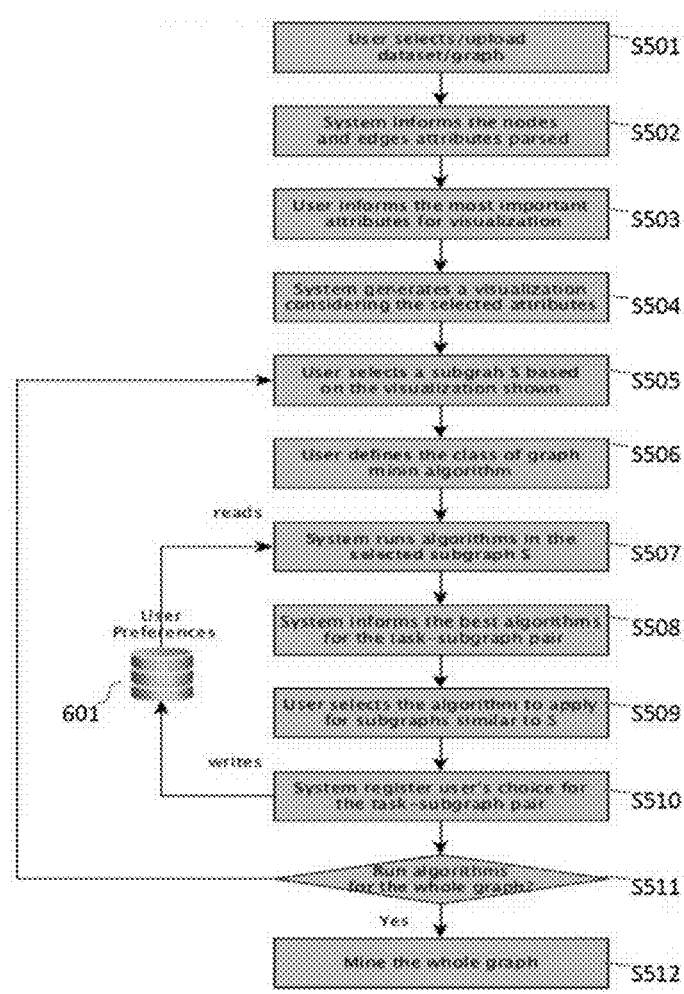
FIG. 5 shows a method of operating the user guided data miner of FIG. 4 according to an exemplary embodiment of the invention.

FIG. 5 illustrates of a method of operating the user guided data miner 96 according to an exemplary embodiment of the invention.

The method includes the Data Miner 96 requesting user feedback from a user to request that the user select a particular dataset or network graph to be analyzed (S501). The presentation module 404 can present a list of the network graphs that are available to analyze on the Display 24 in a graphical user interface. For example, the user may select one of the listed network graphs using a mouse to provide this feedback to the Data Miner 96. The Data selection module 401 can select network graph data from the network graph database 410 for the list, and provide this data to the Presentation Module 404, to enable the Presentation Module 404 to illustrate the list.

The method then includes the Data Miner 96 displaying the node attributes and/or edge attributes of the selected network graph that are available (S502). For example, the Presentation module 404 can display the available node attributes and/or edge attributes in a user interface on Display 24. The available node attributes and edge attributes are stored along with the selected network graph in the network graph database 410. The Data selection module 401 can select the available node attributes and edge attributes from the network graph database 410, and provide this data to the Presentation Module 404. Examples of the attributes include page rank, eigenvalue, eigen vector, centrality, and betweenness.

The method then includes the Data Miner 96 requesting user feedback from the user to request that the user indicate which of the available attributes the user deems to be most important for visualization (S503). The Data Miner 96 can request this user feedback using the presentation module 404. For example, the user can provide this feedback by selecting one of the listed attributes displayed in the user interface on the Display 24.

The method then includes the Data Miner 96 generating a visualization that considers the selected attributes (S504). The visualization mapping module 403 maps the user selected attributes to one or more visualization attributes and selects one or more visualization layouts corresponding to one or more of the selected user attributes. In an embodiment, the visualization mapping module 403 that maps the user selected attributes to one or more visualization attributes, identifies the best structure classification for the selected attributes (e.g., hierarchical structure trees, relational structure networks, temporal structures, spatial structures, or spatio-temporal structures), identifies the best representation for data types (e.g., quantitative, ordered, selective, associative, dissociative, or categorical), and selects one of or more visualization layouts (e.g., force layout, radial, bipartite, edges weight, etc.) according to differential variables (e.g., texture, color, orientation, shape, etc.) corresponding to one or more of the user attributes.

The visualization may be created using a selected one of a plurality of available visualization layouts, such as a force directed graph layout, radial (e.g., radial tree), bipartite graph, bubble chart/comparison/race/race with strings/network/treemap/star ring, dependency graph, circular hierarchy, and alluvial diagram. The visualization is presented in a user interface on the Display 24.

The selection of the most suitable type of visualization may include selecting graphical parameters such as the optimal shapes, colors, sizes, hues, intensities, line style/thickness, and textures used to illustrate the nodes and edges of the network graph. For example, certain combinations of these parameters are better for showing qualitative and quantitative differences. Thus, the User Guided Data Miner 96 can determine whether one of a qualitative and quantitative difference needs to be expressed, and then select the combination of graphical parameters that is appropriate for visualizing the determined difference.

In an embodiment, the visualization layout is selected based on complex network attributes (e.g., node attributes such as degree, class, category, partition or edge attributes such as weight, strength, direction, network topology communities, bipartite, planar, etc.) using machine learning or a statistics technique. Examples of machine learning include supervised learning, decision trees, support vector machines, neural networks, case based reasoning, k-nearest neighbor, unsupervised learning, select-organizing maps, k-means, and expectation management. Examples of the statistic techniques include statistic-based learning, logistic regression, naïve bayers, discriminant analysis, and isotonic separation. Other algorithms may be used to select the visualization layout such as genetic algorithms, group method, fuzzy sets, and rules-based. Further, a legibility metric can be used to define how good is the visualization. For example, a number of crossing edges, number of overlapping nodes, number of visible nodes, or number of visible edges, or use of the available display can be used as the legibility metric.

The method next includes the User Guided Data Miner 96 requesting user feedback from the user to request that the user select a subgraph based on the visualization (S505). The user can provide this feedback by using a mouse or any other pointing device or selection mechanism of the system to select a portion of the visualized graph. For example, the user can use the mouse to draw a circle or a box around a section of the visualized graph to select the subgraph. The user may also use the mouse to select one or more nodes or edges of interest to form the subgraph, assuming these nodes and edges form a connected subgraph. The selection may be performed in an immersive environment. The selection of the subgraph may also be performed by the user entering a search query that is to be applied to the network graph, and the system extracting the subgraph based on the nodes involved in the search query.

The method next includes the data miner 96 requesting user feedback from the user to request that the user select a class of graph mining algorithm (S506). Examples of different classes of graph mining algorithms include link prediction and community detection.

The method next includes the data miner 96 running a plurality graph mining algorithms in the selected class on the selected subgraph to generate a ranking indicating which of the run algorithms is best at interpreting the selected subgraph for the selected attributes (i.e., the selected task) (S507). For example, the class of link prediction includes Common neighbors, Katz, and Adamic/Adar, and the class of Community Detection includes Spectral Partition and Girvan-Newman. The ranking can consider various factors such as cost, running time, accuracy (true positives over true positives and false positives), recall (true positives over true positives and false negatives), etc.

The method next includes the User Guided Data Miner 96 presenting the ranked algorithms to the user (S508). For example, the presentation module 404 can list the ranked algorithms of the selected class in a user interface on the Display 24. The User Guided Data Miner 96 may inform the user of the amount of time each of the ranked algorithms is predicted to take if they are performed on the entire network graph.

The method next includes the data miner 96 requesting user feedback from the user to request that the user select one of the listed ranked algorithms to be applied to subgraphs similar to the previously selected subgraph (S509). The user can provide this feedback by selecting one of the listed ranked algorithms presented by the presentation module 404 in an interface on the Display 24.

The method then includes the User Guided Data Miner 96 registering (storing) the user's choice of algorithm (S510). The registering may include creating an entry including a user identifier of the user, the user's choice of algorithm, the selected attributes, and the selected subgraph. The User Guided Data Miner 96 can store this information in user preferences 601 of the user so it can be used for a future analysis of a graph performed by the user. For example, if the user consistently selects a certain subset of the mining algorithms that are available for the selected class, in an embodiment, the data miner 96 only runs that subset on the selected subgraph during step S507, and skips running the algorithms of the selected class outside the subset. Consideration of the user preferences is optional.

The method then includes the User Guided Data Miner 96 requesting feedback from the user to request that the user indicate whether the selected algorithm should be run on the entire graph (S511). If the user decides not to run the selected algorithm, the method proceeds to step S505 to enable the user to select a new subgraph.

If the user had instead indicated they want to run the selected algorithm, the algorithm execution module of the Data Miner 96 runs the selected algorithm on the entire graph to mine the graph (S512). The Presentation Module 404 can provide the results of the data mining to the user in a user interface on the Display 24.

As an example, the present invention can be applied to a network graph representing a plurality of physicians. In this example, each of the nodes in the network graph represents a different one of the physicians. The node attributes of the nodes include attributes such as specialty (e.g., cardiology, pediatrics, etc), location (e.g., NY, NJ, etc.). The edges can represent the relationship between doctors (e.g., patients in common), and the edge attributes could indicate the number of patients in common. The user can upload this network and then request a visualization for it. The system calculates some graph metrics such as betweenness, centrality, density, etc., and uses them to rank the best layouts to visualize the network. The system can use a legibility metric to choose the initial visualization. The user could accept the initial visualization or try the next one among the ranked visualization layouts. After accepting the visualization, the user interacts with the network. First, the user selects a part of the network (e.g., a subgraph or subnetwork), for example, by filtering the physicians from a particular city having edge weights higher than a predefined weight. For example, this filtering could filter based on the number of patients these physicians share in common with one another. The system then selects this part and plots it. The system could also suggest a visualization layout that best represents this part of the network. The user applies the needed data mining task (e.g., community detection). The system uses the graph properties calculated before to classify and rank the community detection methods and then uses the first one in the rank. The user approves the result or chooses another one of the community detection algorithms, or the user changes the class of mining algorithm (e.g., changes community detection to link prediction). The process continues until the user chooses the mining algorithm for the subgraph and requests that it be run on the whole graph or that the results be exported.

In an exemplary embodiment, the system (e.g., the data miner 96) chooses the most suitable type of visualizations to interpret the data depending on at least one of the number of node classes, the number of relationships between nodes (edges), the importance of certain node classes or relationships, temporal data, the query, and the timing of the analysis. Examples of temporal data include patterns that change over time (see e.g., an alluvial diagram).

In an embodiment, a Bubble visualization is chosen by the system when the analyst is looking for insights from Nodes (e.g., doctors in a social network that have the same number of patients).

In an embodiment, the system presents a dependency graph or a circular hierarchy to show the relationships/edges in a clear and hierarchical way (e.g., doctors that are connected by the same patients).

In an embodiment, if the analyst wants to see a doctor's areas and the increase in the number of patients over time for a given doctor, the system presents the data on an Alluvial diagram.

In an embodiment, the system makes a better combination of saturation, color, and form when plotting the visualization. For example, Bertin's retinal variables can be applied to show quantitative elements, categorical and associative elements. If the visualization shows labels, in an embodiment, the color of the labels is less than 50% of color saturation (color value) than the background to be legible.

An embodiment of the invention can be applied to a network graph that represents data of a social network. In this example, a user selects data (e.g., represented by a network graph) from the social network. The system informs the user that the nodes are people and the edges are messages exchanged by the people, and the graph is undirected. The user informs the system that degree and the time of an edge are the most important attributes. For example, the time of an edge may indicate the time when a message was exchanged. The system plots the graph using a force directed layout. The user selects people that lives in a particular country (e.g., Brazil) and who post about a particular sport (e.g., soccer) as a subgraph. This selection may also be referred to as a query. The user selects a class of mining algorithm known as community detection. The system informs the user that the best algorithm of this class is spectral clustering, and the others are Condutance and Modularity. If the user selects Spectral Clustering, the system re-plots the subgraph. The system registers this as the user's choice and presents the result (e.g., different communities may be presented in different colors). The system asks the user if the user wants to mine the entire graph using the Spectral Clustering. If the user indicates the user does not wish to perform the mining, the user selects another subgraph to run the same algorithm. The system plots the new subgraph. The user applies the algorithm to the whole graph and the system shows the results. The user can save the result and end the interaction.

In an embodiment, the invention may be applied to a network graph (e.g., a directed graph) representing data from health insurance claims. The system informs the user that nodes are doctors and edges are patients in common. The user informs the system that in-degree and doctor specialties and edges weight are the most important attributes. The system may plot the graph using an appropriate visualization. The user selects a subgraph of the visualized graph (e.g., assume the subgraph represents cardiologists from Sao Paulo). The user indicates to the system that a link prediction method is to be applied. The system then informs the user that the best mining algorithm for link prediction is Katz among common neighbors, Adamic/Adar, jaccart, and cosine similarity. If the user selects Katz, the system registers the user choice and presents the result visually (e.g., edges may be presented in different colors or thicknesses). The system asks the use if they want to mine the entire graph. If the user declines, the user can choose a different class of mining detection such as a community detection algorithm for application over this subgraph. Again, the system gives the best options from among available community detection algorithms such as Condutance among spectral methods, modularity, etc. If the user selects, Condutance, the system presents the results (e.g., different color nodes for each community) accordingly. The user can then save the results and end the interaction The modules shown in FIG. 4 may be implemented by various manners, including software, hardware, firmware or a random combination thereof. For example, in some embodiments, the apparatus may be implemented by software and/or firmware. Alternatively or additionally, the system of FIG. 4 may be implemented partially or completely based on hardware. For example, one or more units in the system may be implemented as an integrated circuit (IC) chip, an application-specific integrated circuit (ASIC), a system on chip (SOC), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A user guided data mining system comprising:
a database storing a network graph comprising a plurality nodes and edges, node attributes for the nodes, and edge attributes for the edges; and
a data mining module configured to:
request feedback from a user indicating at least one of the attributes,
visualize the network graph considering the indicated attributes,
request feedback from the user indicating a subgraph of the visualized network graph that gives a best answer to a search query to be applied to the network graph,
request feedback from the user indicating a class of graph mining algorithm to be applied to the network graph, and
run a plurality of different graph mining algorithms of the indicated class on the indicated subgraph to generate a ranking indicating which of the run algorithms is best at interpreting the indicated subgraph for the indicated attributes.

2. The user guided data mining system of claim 1, wherein the data mining module ranks the different graph mining algorithms based on an amount of time it takes to execute each graph mining algorithm on the subgraph of the network graph.

3. The user guided data mining system of claim 1, wherein the data mining module is configured to request feedback from the user indicating one of the ranked graph mining algorithms.

4. The user guided data mining system of claim 1, wherein the data mining module stores the indicated one graph mining algorithm as a user preference of the user.

5. The user guided data mining system of claim 4, wherein the data mining module selects the different graph mining algorithms in consideration of the user preference.

6. The user guided data mining system of claim 3, wherein the data mining module performs data mining on the entire network graph using the indicated one graph mining algorithm.

7. The user guided data mining system of claim 1, wherein the user indicates the subgraph of the network graph by entering the search query to be applied to the network graph, and the data mining module extracts the subgraph of the network graph that satisfies the search query.

8. The user guided data mining system of claim 1, wherein the data mining module is configured enable the user to indicate the class of graph mining algorithm is one of community detection and link prediction.

9. The user guided data mining system of claim 1, wherein the network graph represents data of a social network, where the nodes represent people and the edges represent messages exchanged by the people.

10. A method of operating a user guided data miner on a network graph, the method comprising:
requesting feedback from a user indicating at least one of a plurality attributes of the network graph;
visualizing the network graph considering the indicated attributes;
requesting feedback from the user indicating a subgraph of the visualized network graph that gives a best answer to a search query to be applied to the network graph;
requesting feedback from the user indicating a class of graph mining algorithm to be applied to the network graph; and
running a plurality of different graph mining algorithms of the indicated class on the indicated subgraph to generate a ranking indicating which of the run algorithms is best at interpreting the indicated subgraph for the indicated for the attributes.

11. The method of claim 10, wherein the plurality of attributes include node attributes associated with nodes of the network graph and edge attributes associated with edges of the graph.

12. The method of claim 10, further comprising:
requesting feedback from the user indicating one of the ranked graph mining algorithms; and
performing data mining on the entire graph using the indicated one graph mining algorithm.

13. The method of claim 10, further comprising:
requesting feedback from the user indicating one of the ranked graph mining algorithms; and
storing the indicated one graph mining algorithm as a user preference of the user.

14. The method of claim 13, wherein the different graph mining algorithms are chosen in consideration of the stored user preference.

15. The method of claim 10, further comprising extracting the subgraph of the network graph using the search query provided by the user for the network graph.

16. The method of claim 10, wherein the requesting of the feedback from the user indicating the class of graph mining algorithm comprises providing the user with a choice between community detection and link prediction.

17. A computer program product for providing user guided data mining of a network graph, the computer program product comprising a computer readable storage medium having program code embodied therewith, the program code executable by a processor, to perform method steps comprising instructions for:
requesting feedback from a user indicating at least one of a plurality attributes of the network graph;
visualizing the network graph considering the indicated attributes;
requesting feedback from the user indicating a subgraph of the visualized network graph that gives a best answer to a search query to be applied to the network graph;

requesting feedback from the user indicating a class of graph mining algorithm to be applied to the network graph; and running a plurality of different graph mining algorithms of the indicated class on the indicated subgraph to generate a ranking indicating which of the run algorithms is best at interpreting the indicated subgraph for the indicated attributes.

18. The computer program product of claim 17, wherein the plurality of attributes include node attributes associated with nodes of the network graph and edge attributes associated with edges of the graph.

19. The computer program product of claim 17, wherein the method steps further comprise instructions for:

requesting feedback from the user indicating one of the ranked graph mining algorithms; and performing data mining on the entire graph using the indicated one graph mining algorithm.

20. The computer program product of claim 17, wherein the method steps further comprise instructions for:

requesting feedback from the user indicating one of the ranked graph mining algorithms; and storing the indicated one graph mining algorithm as a user preference of the user.

* * * * *